Aug. 2, 1938.  A. S. HOWELL  2,125,567
PHOTOGRAPHIC CAMERA
Filed Jan. 5, 1937  2 Sheets-Sheet 1
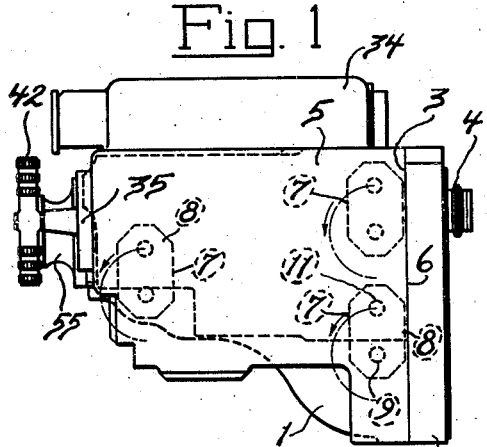
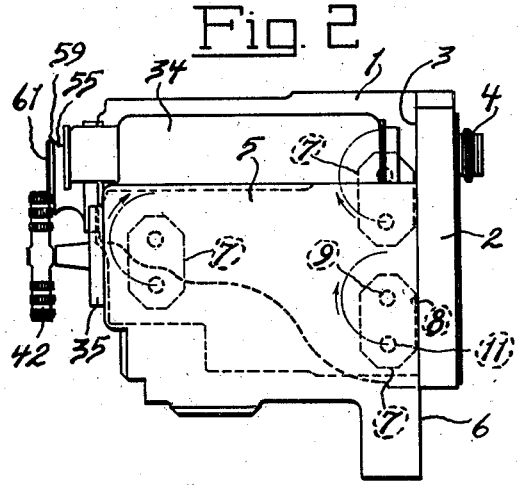
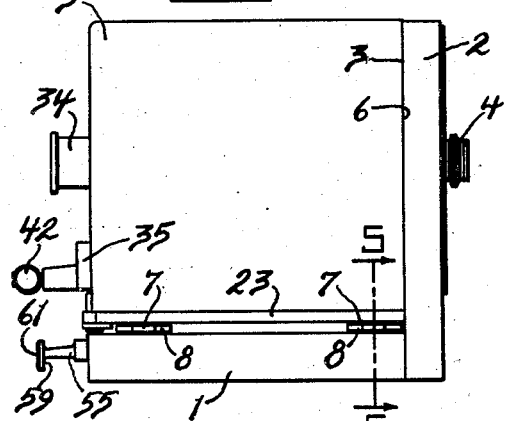
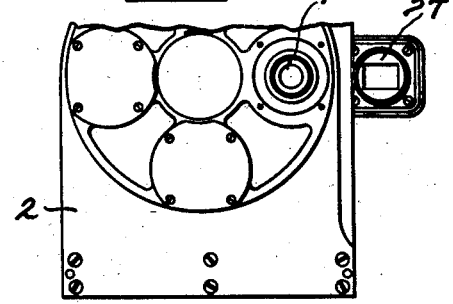
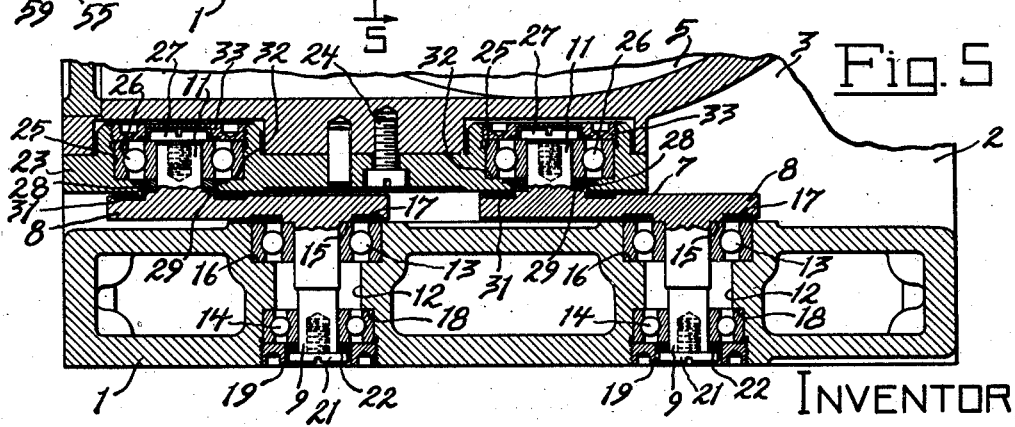
INVENTOR
ALBERT S. HOWELL
BY Robert F. Miehle, Jr.
ATTY.

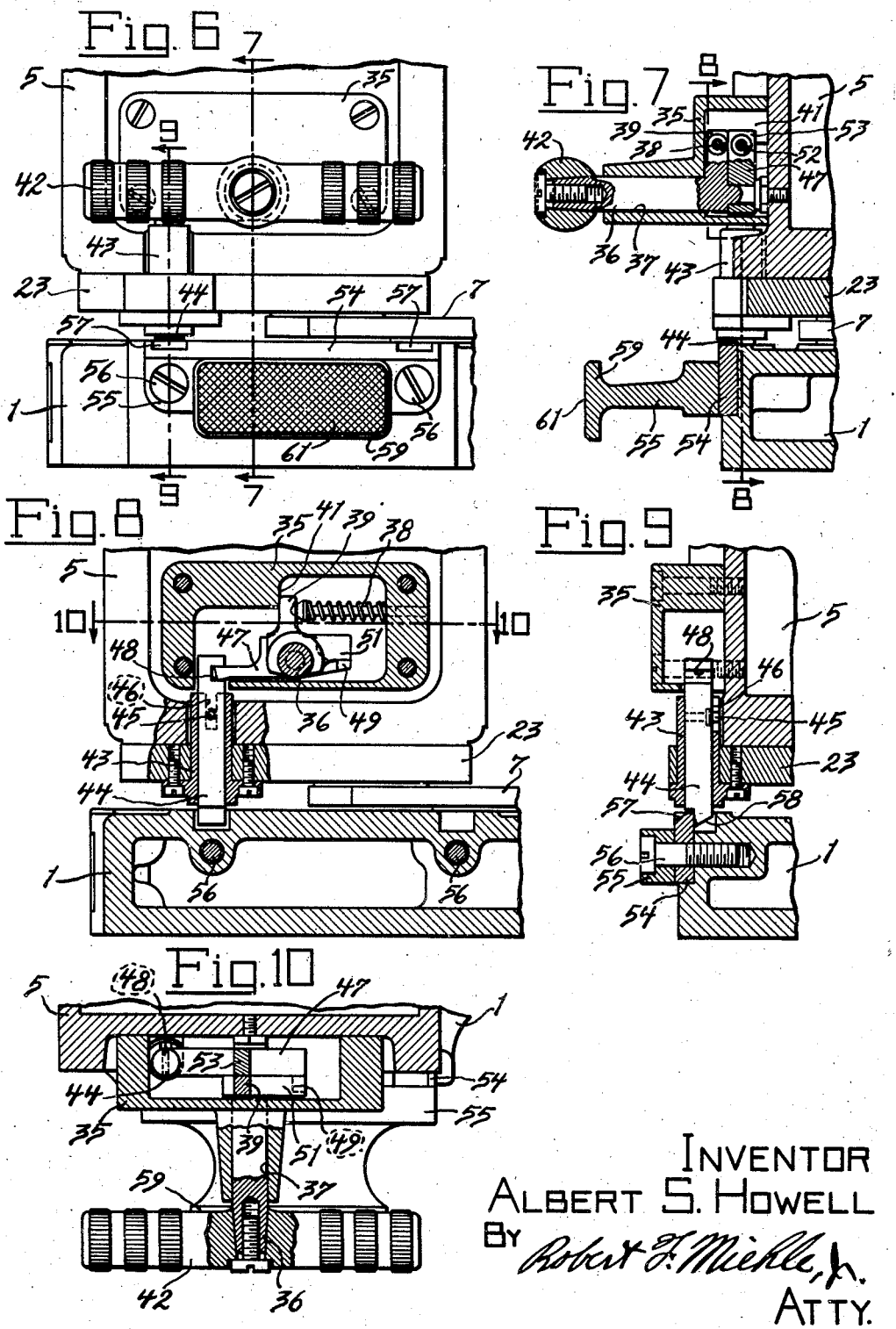

Patented Aug. 2, 1938

2,125,567

UNITED STATES PATENT OFFICE 2,125,567

PHOTOGRAPHIC CAMERA

Albert S. Howell, Chicago, Ill., assignor to The Bell & Howell Company, Chicago, Ill., a corporation of Illinois Application January 5, 1937, Serial No. 119,103

8 Claims. (Cl. 88—16)

My invention relates particularly to motion picture cameras although not limited to this use alone and concerns photographic cameras wherein the camera body, in which the sensitized photographic element or film is carried, is shiftable relative to the photographic lens to permit viewing through the photographic lens for purposes of accurately focusing the photographic lens and placing the camera.

The general object of my invention resides in the provision of a novel photographic camera of this type which provides for accurate and convenient relative shifting of the camera body, which is not subject to derangement, and which is well adapted to withstand the usual conditions of usage.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a top plan view of a motion picture camera embodying my invention, showing the camera in condition for photographing;

Figure 2 is a similar view showing the camera in condition for viewing through the photographic lens;

Figure 3 is a side elevation of the camera;

Figure 4 is a front elevation of the camera in condition for photographing;

Figure 5 is an enlarged partial section substantially on the line 5—5 of Figure 3;

Figure 6 is an enlarged partial rear elevation of the camera;

Figure 7 is a partial section substantially on the line 7—7 of Figure 6;

Figure 8 is a partial section substantially on the line 8—8 of Figure 7;

Figure 9 is a partial section substantially on the line 9—9 of Figure 6; and

Figure 10 is a partial section substantially on the line 10—10 of Figure 8.

Referring to the drawings, 1 designates a base portion which is normally supported in a generally horizontal plane and 2 designates a photographic lens carrying portion fixedly secured on said base portion and extending upwardly from the front end of said base portion and forming therewith a photographic lens carrying member, the lens carrying portion providing a rearwardly facing surface 3, and a photographic lens 4 being mounted on the portion 2 and disposed on an axis generally normal to the plane of the surface 3. See Figures 1 to 4 inclusive.

A camera body 5 is arranged rearwardly of the lens carrying portion 2 in the angle formed by the portions 1 and 2 of the lens carrying member, and provides a forwardly facing surface 6 which is engageable with the rearwardly facing 3 of the lens carrying portion 2. As is usual the camera body 5 is adapted to carry a film therein and contains a suitable exposure means including an exposure aperture, means for intermittently feeding the film past the exposure aperture and a light shutter operating in timed relation with the feeding means for exposing successive sections or frames of the film, the aforesaid exposure means not being illustrated for the reason that it is so well known in the art.

The camera body 5 is mounted on the base portion 1 for shifting movement relative to the lens carrying member by the novel mounting means now to be described. See Figures 1, 2 and 5.

As shown, the aforesaid mounting means consists of three correspondingly disposed cooperating arcual mounting devices, generally designated at 7, spaced in triangular relation and affording arcual bodily shifting of the camera body relative to the lens carrying member, two of these mounting devices being arranged adjacent the lens carrying portion 2 and spaced transversely of the camera in parallelism with the surface 3 and the third of these mounting devices being spaced rearwardly from the aforesaid two mounting devices.

Each of the mounting devices consists as follows:

A pivot arm 8 is provided with integral spaced parallel bearing studs 9 and 11 extending oppositely from the body of the pivot arm. The stud 9 extends downwardly into a vertical bore 12 in the base portion 1 and is pivotally supported vertically therein by vertically spaced radial and thrust anti-friction bearings 13 and 14. See particularly Figure 5.

The upper bearing 13 forms a downward thrust bearing for the pivot arm 8 by reason of a shoulder 15 on the pivot arm bearing downwardly against the inner race of the bearing 13 and a shoulder 16 in the bore 12 bearing upwardly against the outer race of the bearing 13. A sealing washer 17 of felt or like material is interposed between the pivot arm 8 and the top of the bearing 13 to exclude dust and dirt from the bearings 13 and 14.

The outer race of the bearing 14 is clamped upwardly against a downwardly facing shoulder 18 in the bore 12 by a clamp ring 19 screwthreaded into the lower end of the bore 12, and a headed screw 21 is screwthreaded into the lower end of the stud 9 and bears upwardly against a collar 22 on the stud 9, which collar in turn bears upwardly against the inner race of the bearing 14, whereby the bearing 14 forms an upward thrust bearing for the pivot arm 8.

The camera body 5 is provided with a base plate 23 which is fixedly secured therewith, as designated at 24. The stud 11 of the pivot arm 8 extends upwardly into a vertical bore 25 in the base plate 23 and is pivotally supported vertically therein by a radial and thrust anti-friction bearing 26. A headed screw 27 is screwthreaded into the upper end of the stud 11 and, bearing downwardly on the inner race of the bearing 26, clamps this inner race downwardly against a collar 28 which in turn bears downwardly against an upwardly facing shoulder 29 on the pivot arm 8, thus axially fixing the bearing 26 on the stud 11. A sealing washer 31 of felt or like material is interposed between the pivot arm 8 and the bottom surface of the base plate 23 to exclude dust and dirt from the bearing 26.

The outer race of the bearing 26 is clamped downwardly against an upwardly facing shoulder 32 in the bore 25 by a clamp cap 33 screwthreaded into the upper end of the bore 25, whereby the bearing 26 forms an upward and downward thrust bearing for the camera body with reference to the pivot arm 8.

As shown, each of the aforesaid arcual mounting devices are identical and are correspondingly arranged so that the camera body 5 is predeterminately shiftable with reference to the photographic lens carrying member, in an arcuate path extending in the horizontal axial plane of the photographic lens 4 both transversely of the axis of the photographic lens and longitudinally of the lens axis, the camera body being maintained in a predetermined relation with the lens carrying member in the plane of said shifting movement, said shifting movement involving an arc of 180°.

The surfaces 3 and 6 are engaged at both terminal positions of the camera body 5 relative to the lens carrying member, and in one of these terminal positions the exposure aperture of the camera body is alined with the photographic lens 4 for the exposure of the film in the camera body through the lens, as shown in Figures 1 and 4, and in the other of these terminal positions, as shown in Figure 2, the exposure aperture of the camera body is laterally displaced from the photographic lens for viewing therethrough as through a suitable viewing device 34 fixed on one side of the camera body for viewing through the camera lens for accurately focusing the photographic lens and placing the camera, the exposure aperture of the camera body and the viewing device alternating in their alinement with the photographic lens with positioning of the camera body in its opposite terminal positions.

The novel mounting means for the camera body described hereinabove affords an accurate and desirably convenient and smooth shifting movement of the camera body, is not subject to derangement and is well adapted to withstand the usual conditions of usage.

Secured on the rear wall of the camera body 5, is a casing 35, and a rearwardly and forwardly extending shaft 36 is pivotally mounted in an extended bore 37 through the rear wall of the casing 35. See Figures 6 to 10.

A spring device 38 acts on a radial arm 39 fixed on the shaft 3 and yieldably urges this arm against a shoulder 41 of the casing 35 to effect a normal angular positioning of the shaft 36. An exterior handle 42 is secured on the rear end of the shaft 36 and, being disposed at the rear of the camera body 5, serves as a convenient handle for shifting the camera body.

A vertically disposed bushing 43 is fixed on the rear portion of the base plate 23, and a latch stud 44 is slidably engaged in this bushing for vertical movement, the stud 44 being angularly fixed by means of a radial pin 45 thereon slidably engaging a vertical slot 46 in the bushing 43.

A rocker arm 47 is pivotally mounted on the inner end of the shaft 36 within the casing 35, and one end of this arm engages a transverse slot 48 on the upper portion of the latch stud 44 for vertically actuating the latch stud. The other end of arm 47 is provided with a rearwardly projecting terminal portion 49 which underlies a radial arm 51 fixed on the shaft 36, for engagement therewith to the end that pivotal movement of the shaft 36 by means of the handle 42 in opposition to the spring device 38 serves to elevate the latch stud 44 into unlatching position.

A spring device 52 acts on a radial arm 53 of the rocker arm 47 and serves to urge this rocker arm in the direction to position the latch stud 44 in its lower or latching position, movement of the rocker arm in this direction being limited by engagement of the arm 53 against the shoulder 41.

A transversely extending latch plate 54 and a rearwardly extending bracket 55 are secured by means of screws 56 on the rear end of the base plate 23, and the latch stud 44 is adapted to be engaged in front of the latch plate in the terminal positions of the camera body 5 to latch the same in such positions, the surfaces 3 and 6 of the lens carrying portion 2 and of the camera body being engaged in such terminal positions.

To provide for spring latching of the latch stud 44, the upper edge of the latch plate 54 is slanted at the engagement points of the latch stud 44 therewith, as designated at 57, and the lower end of the latch stud is correspondingly slanted, as designated at 58.

By reason of the engagement of the radial arm 51 of the shaft 36 with the portion 49 of the rocker arm 47, the conveniently rearwardly disposed handle 42, mounted on the camera body, serves by being grasped by a hand of the operator both to release the latch means, which latches the camera body in the terminal positions of the camera body, and as a convenient handle for shifting the camera body to its opposite terminal positions.

The bracket 55 is disposed beneath the handle 42 in contiguous relation therewith and, extending rearwardly from the latch plate 54 and the base portion 1 of the photographic lens carrying member, is provided at its rear end with a transversely extending enlarged portion 59 forming a rearwardly facing surface 61 adapted to be engaged by the thumb of a hand of the operator while such hand grasps the handle 42, thus providing a formation in the nature of a fulcrum promoting convenient and smooth shifting of the camera body.

Having thus described my invention, I do not wish to be limited to the precise details described as changes may be readily made without departing from the spirit of my invention, but having thus described my invention, I claim as new and desire to secure by Letters Patent the following:

1. In a photographic camera the combination with a photographic lens carrying member comprising a base portion and a forwardly disposed lens carrying portion extending upwardly from said base portion and providing a rearwardly facing surface, and a camera body overlying said base portion and arranged rearwardly of said lens carrying portion and providing a forwardly facing surface engageable with said rearwardly facing surface, of a plurality of correspondingly disposed and spaced cooperating pivot arm devices operative between said base portion and said camera body and each of which is pivotally connected with said base portion and said camera body on spaced parallel axes disposed normal to an axial plane of said lens, said devices affording arcual bodily shifting of said camera body relative to said lens carrying member in said plane, said surfaces engaging in at least one terminal position of said camera body.

2. In a photographic camera the combination with a photographic lens carrying member and a cooperating camera body, of means affording bodily shifting movement of said camera body relative to said lens carrying member, releasable latch means operative between said lens carrying member and said camera body adapted to latch said camera body in at least one position of its shifting movement, and a handle movably mounted on said camera body and operatively connected with said latch means to release the same and serving as a handle for shifting said camera body.

3. In a photographic camera the combination with a photographic lens carrying member and a cooperating camera body, of means affording bodily shifting movement of said camera body relative to said lens carrying member, and contiguous elements on said lens carrying member and said camera body comprising a handle and a formation adapted to be engaged by the thumb of a person's hand while such hand grasps said handle for effecting shifting movement of said camera body.

4. In a photographic camera the combination with a photographic lens carrying member and a cooperating camera body, of means affording bodily shifting movement of said camera body relative to said lens carrying member, releasable latch means operative between said lens carrying member and said camera body adapted to latch said camera body in at least one position of its shifting movement, and contiguous elements on said lens carrying member and said camera body comprising a handle and a formation adapted to be engaged by the thumb of a person's hand while such hand grasps said handle for effecting shifting movement of said camera body, said handle being movably mounted and operably connected with said latch means to release the same.

5. In a photographic camera the combination with a photographic lens carrying member and a cooperating camera body, of means affording bodily shifting of said camera body relative to said lens carrying member both transversely and longitudinally of the axis of said lens and including means for maintaining said camera body in a predetermined relation with said lens carrying member in the plane of said shifting movement, releasable latch means operative between said lens carrying member and said camera body to latch said camera body in at least one position of its shifting movement, and a handle movably mounted on said camera body and operatively connected with said latch means to release the same and serving as a handle for shifting said camera body.

6. In a photographic camera the combination with a photographic lens carrying member and a cooperating camera body, of at least three correspondingly disposed cooperating pivot arm devices spaced in triangular relation and each of which is pivotally connected with said lens carrying member and said camera body on spaced parallel axes disposed normal to an axial plane of said lens, said devices cooperating to afford bodily shifting movement of said camera body relative to said lens carrying member in said plane, releasable latch means operative between said lens carrying member and said camera body to latch said camera body in the terminal positions of its said movement, and a handle movably mounted on the rear portion of said camera body and operatively connected with said latch means to release the same and serving as a handle for shifting said camera body.

7. In a photographic camera the combination with a photographic lens carrying member comprising a base portion and a forwardly disposed lens carrying portion extending upwardly from said base portion, and a camera body overlying said base portion rearwardly of said lens carrying portion, a plurality of correspondingly disposed spaced cooperating mounting devices between said camera body and said base portion affording arcual bodily shifting of said camera body relative to said lens carrying member, releasable latch means operative between said camera body and said base portion for latching said camera body in the terminal positions of its said movement, and a handle pivotally mounted on said camera body and disposed at the rear thereof and operatively connected with said latching means for releasing the same and serving as a handle for shifting said camera body.

8. In a photographic camera the combination with a photographic lens carrying member comprising a base portion and a forwardly disposed lens carrying portion extending upwardly from said base portion and providing a rearwardly facing surface, and a camera body overlying said base portion rearwardly of said lens carrying portion and providing a forwardly facing surface engageable with said rearwardly facing surface, of a plurality of correspondingly disposed and spaced cooperating pivot arm devices operative between said base portion and said camera body and each of which is pivotally connected with said base portion and said camera body on spaced parallel axes disposed normal to an axial plane of said lens, said devices affording arcual bodily shifting of said camera body relative to said lens carrying member in said plane, said surfaces engaging in opposite terminal positions of said camera body, releasable latch means operative between said camera body and said base portion to latch said camera body in the terminal positions thereof, a handle pivotally mounted on said camera body and disposed at the rear thereof and operatively connected with said latching means for releasing the same and serving as a handle for shifting said camera body, and a formation on the rear of said base portion and contiguous to said handle to be engaged by the thumb of a person's hand while such hand grasps said handle.

ALBERT S. HOWELL.